Oct. 27, 1931.　　　　J. BAILEY ET AL　　　　1,829,180

CHUCK

Filed Nov. 30, 1929　　2 Sheets-Sheet 1

INVENTORS
JAMES BAILEY &
BY J. LELAND MILLER.

ATTORNEYS.

Oct. 27, 1931.   J. BAILEY ET AL   1,829,180
CHUCK
Filed Nov. 30, 1929   2 Sheets-Sheet 2

INVENTORS
JAMES BAILEY &
BY J. LELAND MILLER.
ATTORNEYS.

Patented Oct. 27, 1931

1,829,180

UNITED STATES PATENT OFFICE

JAMES BAILEY AND JOHN LELAND MILLER, OF CORNING, NEW YORK, ASSIGNORS TO CORNING GLASS WORKS, OF CORNING, NEW YORK, A CORPORATION OF NEW YORK

CHUCK

Application filed November 30, 1929. Serial No. 410,800.

This invention relates to chucks and more particularly to devices for holding glass articles during finishing.

Much difficulty has heretofore been experienced in securely holding glass articles such as cylinders, tubes and the like while their ends were being ground, owing to the fact that the grinding compound and water would soon find their way into the working parts, causing rapid wear and loose fits, often creating so much friction between the working parts as to render them wholly inoperative.

This invention has for its object to securely hold glass articles during finishing operations, without danger of dislodgement through inaccurate contact of the ware-holding device with the ware.

A feature of the invention is the holding of the articles in the chuck by means of air pressure, thus rendering unnecessary the use of mechanical parts such as slides, cams and the like. Briefly, the invention embodies a rigid frame provided with rests for supporting one side of the ware and an inflatable and expansible member for engagement with the opposite side of the ware so that air pressure in the expansible member will expand the latter against the ware and firmly clamp it against the rests.

Figure 1:
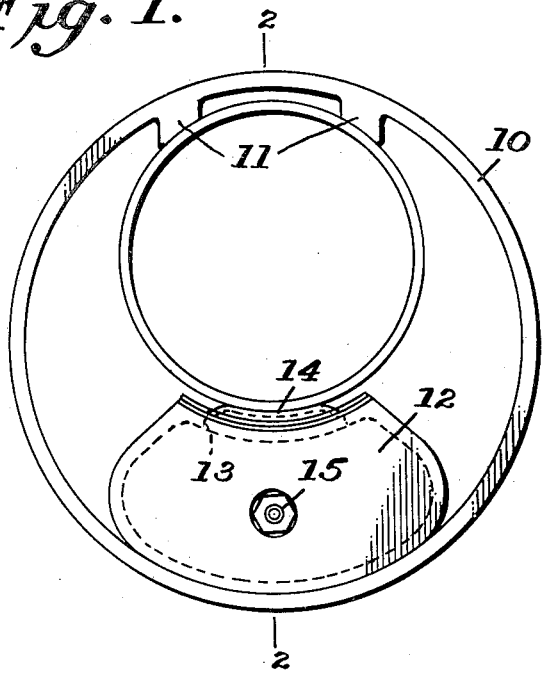
Fig. 1 is a plan view of a chuck constructed in accordance with this invention and adapted for holding large ware such as gasoline cylinders.
Figure 2:
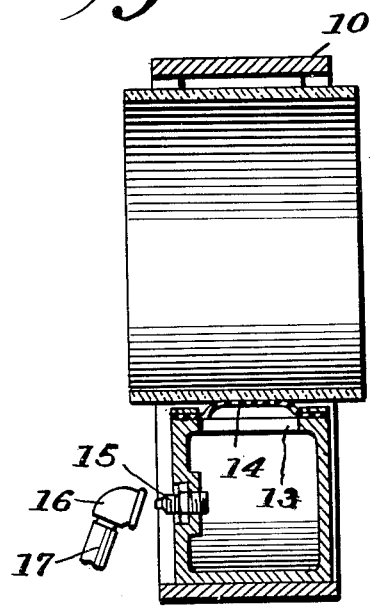
Fig. 2 is a longitudinal, sectional view taken on the line 2—2 of Fig. 1.

Referring to the drawings and more particularly to the structure illustrated in Figs. 1 and 2, the chuck consists of a ring 10 which is formed with a pair of inwardly projecting spaced lugs 11 against which the article to be supported is seated. Secured in diametrically opposed relation to the spaced lugs 11 is a pressure chamber 12, the outer wall conforms to the shape of the ring 10, while its inner wall is preferably shaped to generally follow the contour of the ware which is to be supported. Formed in the inner wall and extending substantially throughout its entire area is an opening 13 which is closed by an inflatable and expansible wall 14 which, as illustrated in Figs. 1 and 2, is adapted to be expanded into contact with the piece of ware which is to be held. A suitable valve 15 is secured in one of the end walls of the pressure chamber 12 for the admission of air under pressure into the chamber. This may be accomplished by employing a fitting 16 similar to those commonly used for inflating pneumatic tires and this fitting is connected by means of a flexible tube 17 to any suitable source of air pressure supply.

Figure 3:
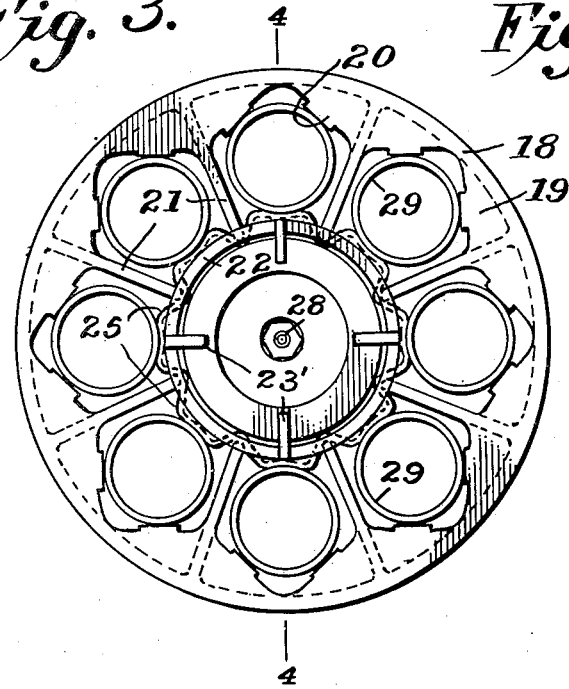
Fig. 3 is a view similar to Fig. 1 showing a chuck for holding a plurality of tubes, cylinders of less diameter than the cylinder illustrated in Fig. 1.
Figure 4:
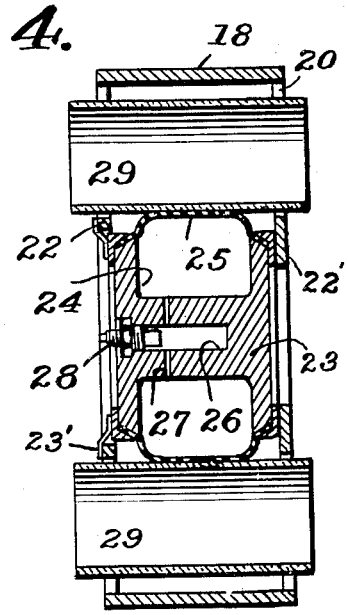
Fig. 4 is a sectional view taken on the line 4—4 of Fig. 3.

In the modification illustrated in Fig. 3 we employ a ring 18 which is formed at opposite ends with inwardly extending webs 19 carrying inwardly projecting lugs 20 which form seats for the articles of ware. Extending inwardly toward the center of the ring between the pairs of seats formed by the lugs 20 are webs 21 which terminate at their inner ends in rings 22 and 22', the latter serving as a support for one end of a hub member 23, the opposite end of which is supported by clamps 23' which are secured to the ring 22. The hub member 23 is formed with a peripheral groove 24 and is surrounded by a flexible and expansible member 25, as will be clearly seen upon reference to Figs. 3 and 4. A passage 26 is formed axially of the hub member 23 and this passage communicates with the groove 24 by means of radial passages 27. Entering one end of the passage 26 is a valve 28 which like the valve 15 above described, cooperates with the air line 17 and fitting 16 for admitting air under pressure into the groove 24, thus causing the member 25 to expand against the articles of ware 29 and thereby force the latter against their seats to rigidly hold them in the chuck.

Figure 5:
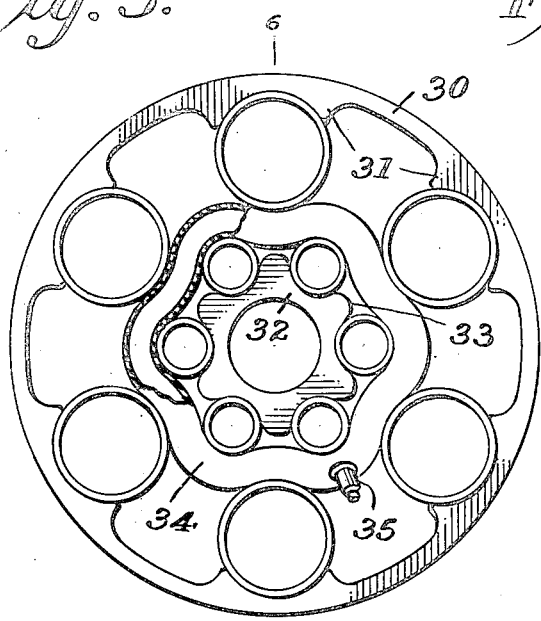
Fig. 5 is a further modification of the invention showing it arranged for holding a plurality of tubes or cylinders of mixed diameters.
Figure 6:
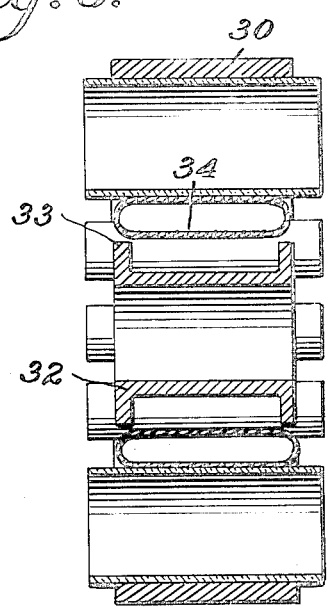
Fig. 6 is a sectional view taken on the line 6—6 of Fig. 5.

In the modification of the invention illustrated in Figs. 5 and 6, we provide a ring 30 which is formed at spaced intervals with inwardly projecting lugs 31 forming seats against which certain of the articles of ware rest. A hub member 32 provided with outwardly extending spaced radial lugs 33 is also provided and the spaces between these lugs form seats for articles of ware of a different size from those above described. Interposed between the inner and outer rows of articles of ware is a continuous ring shaped tube 34 which is formed of expansible material and provided with a valve 35 through which air under pressure may be introduced into its interior through the pressure line 17 and fitting 16 previously described.

Figure 7:
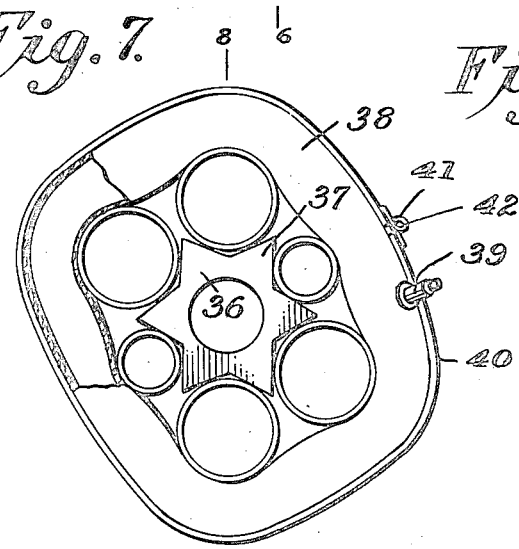
Fig. 7 is a still further modification of the invention illustrating a different arrangement of the supporting and inflatable members.
Figure 8:
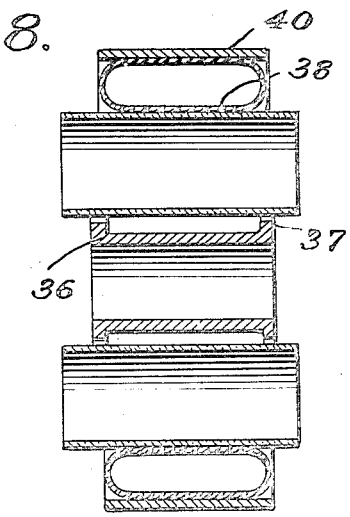
Fig. 8 is a sectional view taken on the line 8—8 of Fig. 7.

In the modification illustrated in Fig. 7 there is provided a hub member 36 which is formed with radially projecting lugs 37 between which articles of ware of varying sizes may be seated. An expansible ring-shaped tube 38 surrounds the articles of ware as illustrated and like the tube 34, the latter is provided with a valve 39 for the admission of air under pressure. In order to properly direct the expansion of the tube and secure the articles in the hub member 36, a band of flexible but non-expansible material 40 encircles the tube 38, it being understood that opposite ends of this band carry hinge barrels 41 which may be interlocked to receive a hinge pin 42 by which the band is held in proper relation to the parts and yet may be easily and quickly removed when the tube is deflated and the pressure relieved.

Figure 9:
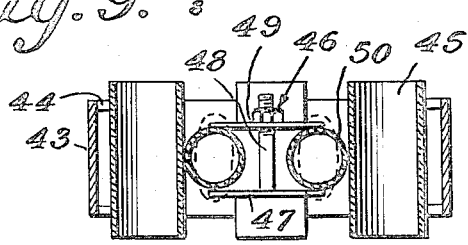
Fig. 9 is a sectional view through a further modification of the invention.

In the modification illustrated in Fig. 9, we provide a ring 43 which like the ring 18 is provided at opposite ends with inwardly extending webs 44 forming seats against which the ware 45 engages. A hub member designated generally 46 and consisting of a base plate 47 carrying an upstanding threaded lug 48 is provided. Adjustably supported on the lug 48 is a clamping plate 49 and arranged between the base plate 47 and clamping plate 48 is a ring-shaped tube 50 of flexible and expansible material. Unlike the tubes 34 and 38 above described, the tube 50 is provided with no valve and its expansion and contraction is affected by relative movement between the plates 47 and 49.

In operation articles of ware are introduced into the chucks between the seats and the expansible members whereupon air is admitted through the valves into the expansible members, thus causing them to securely bind the articles in place, thus eliminating the necessity of using cams, slides and other mechanical devices which are apt to be injured by the grinding compound and water employed for grinding glassware. When the type of chuck illustrated in Fig. 9 is used, however, instead of admitting air through a valve into the tubes, the plates 47 and 49 are advanced toward each other, causing the tube to be compressed into gripping position with relation to the articles 45.

While in the foregoing there has been shown and described preferred embodiments of our invention, it is to be understood that minor changes in the details of construction, combination and arrangement of parts may be resorted to without departing from the spirit and scope of the invention as claimed.

What is claimed is:

1. A chuck for holding glass articles which includes seats against which the articles rest and a tubular expansible member for holding the articles in said seats.

2. A chuck for holding glass articles which includes seats against which the articles rest and an inflatable, expansible member for holding the articles in the seats.

3. A chuck for holding glass articles which includes a body having seats against which the articles rest and a tubular expansible member for holding the articles in the seats.

4. A chuck for holding glass articles which includes a ring having seats against which the articles rest and a tubular expansible member for holding the articles in the seats.

5. A chuck for holding glass articles which includes a ring having seats against which the articles rest and an inflatable expansible member for holding the articles in the seats.

6. A chuck for holding glass articles which includes a body having seats against which the articles rest and a tubular expansible ring-shaped member for holding the articles in the seats.

7. A chuck for holding glass articles which includes a body having seats against which the articles rest and an inflatable expansible ring-shaped member for holding the articles in the seats.

JAMES BAILEY.
J. LELAND MILLER.